Figure 1:
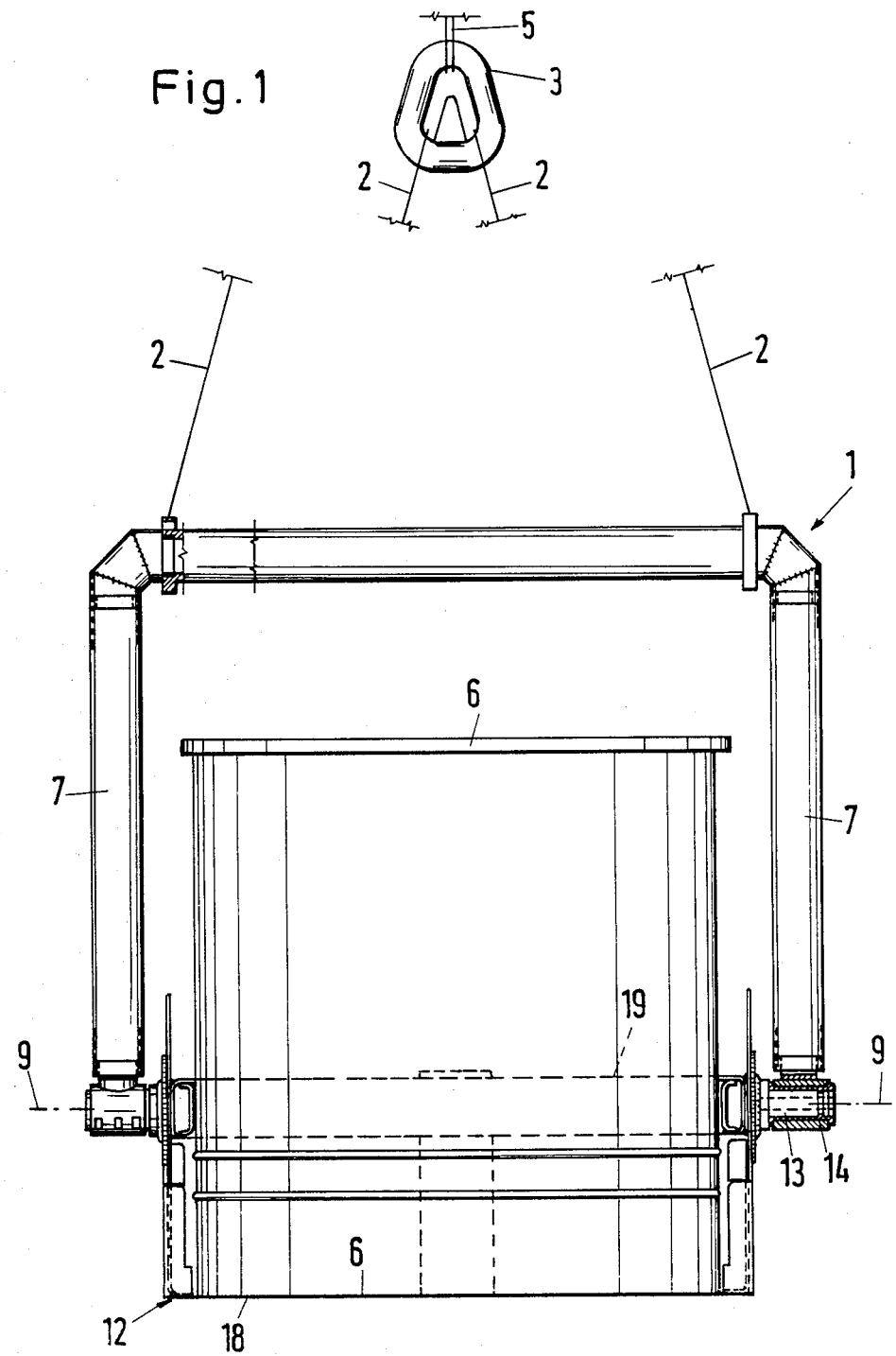

United States Patent [19]

Perren et al.

[11] Patent Number: 4,930,826
[45] Date of Patent: Jun. 5, 1990

[54] CARGO APPARATUS FOR ATTACHING A CARGO CONTAINER TO AN AIRCRAFT

[75] Inventors: Beat H. Perren, Zermatt, Switzerland; Albino Rossi, Gorla Minore, Italy

[73] Assignee: Air-Zermatt AG., Zermatt, Switzerland

[21] Appl. No.: 208,420

[22] Filed: Jun. 16, 1988

[30] Foreign Application Priority Data

Jun. 19, 1987 [CH] Switzerland ............... 2319/87

[51] Int. Cl.⁵ .................... B66C 3/16; A62C 31/00
[52] U.S. Cl. ......................... 294/68.27; 169/53
[58] Field of Search ................... 294/68.27, 68.26; 239/171; 244/137.4; 169/53, 34

[56] References Cited

U.S. PATENT DOCUMENTS

| | | | |
|---|---|---|---|
| 2,823,061 | 2/1958 | Pottorf | 294/68.27 |
| 3,127,645 | 4/1964 | Dyck | 294/68.27 |
| 3,230,003 | 1/1966 | McAfoos, Jr. et al. | 294/68.27 |
| 3,670,912 | 6/1972 | Dunbar | 294/68.26 |

FOREIGN PATENT DOCUMENTS 0073956 8/1982 European Pat. Off. .......... 169/53

Primary Examiner—Margaret A. Focarino
Assistant Examiner—Dean J. Kramer
Attorney, Agent, or Firm—Brady, O'Boyle & Gates

[57] ABSTRACT

A holder (48, 49) for the cargo container (36) is supported so as to be able to rotate on a carrier frame (31) that is to be attached to an aircraft, in particular a helicopter, the container (48, 49) is connected with two fluid-drive double-acting cylinder-piston units (40, 41) that are mounted on the arms (37, 38) of the carrier (31), by means of which it together with the container (36) can be rotated. The container (36) is connected through the connector elements (54, 55) with the retainer plates (48, 49) so as to be releasable, so that the container that is brought back empty by an aircraft returning from one trip can be replaced by a container that has been filled or charged meantime, so that the aircraft can take-off once again almost immediately.

4 Claims, 4 Drawing Sheets

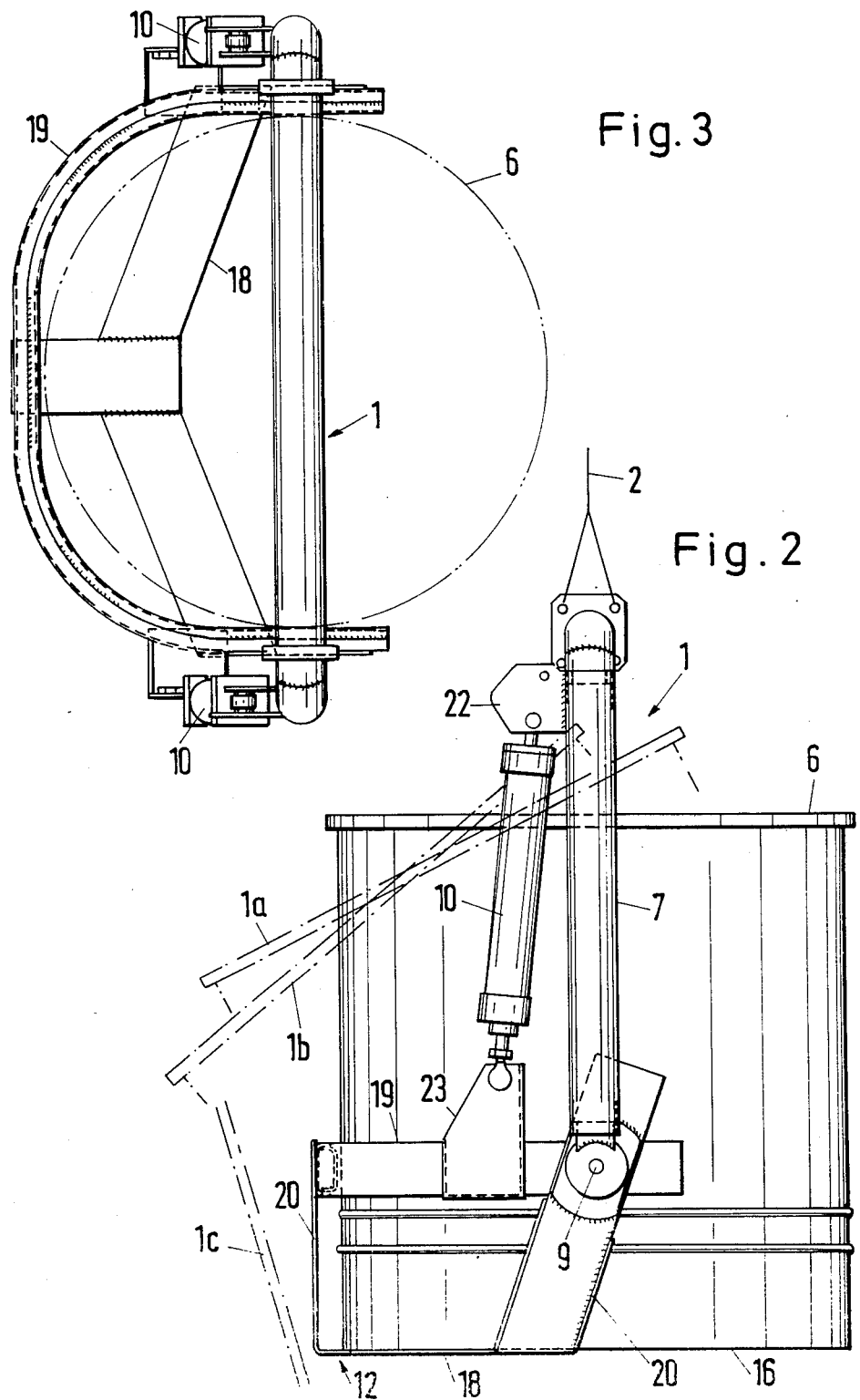

CARGO APPARATUS FOR ATTACHING A CARGO CONTAINER TO AN AIRCRAFT

The present invention relates to a cargo apparatus for attaching a cargo container to an aircraft, in particular a helicopter, this having a U-shaped supporting frame that is to be attached to the aircraft, this frame then supporting a cargo container that can be rotated about a horizontal axis, and a drive system for this container. Known apparatuses of this kind are used for fire-fighting, when the container is filled by being immersed in a body of open water, when it is then flown to the sight of the fire and there emptied. In such an apparatus (US-A-3 248 074) the centre of gravity of the container, both when filled and when empty, is located beneath the axis on rotation with the result that the container is always in a stable state of equilibrium and, after being rotated, automatically returns to its rest position. A lever arm is secured to the container and a tension cable that is used to rotate the container is attached to this. In another apparatus of this kind (EP-A-O 004 955) when the container is in the rest position the axis of rotation is located above the centre of gravity when the container is empty, but lies beneath the centre of gravity when the container is full. The container which is thus in equilibrium when filled, is prevented from rotating by means of a locking system that can be released from within the aircraft. When this locking system is released, the filled container rotates automatically and abruptly by approximately 180°, and empties, in which connection it is stable so that it returns automatically to its stable state once emptied, whereupon the locking system engages and once again prevents it from rotating.

The container used in this known apparatus can be filled very rapidly from an open body of water. If, however, all that is available is a water main or in the event that something other than fire-fighting water is to be carried, much valuable fire-fighting time is lost when filling the container and, in every case, costly aircraft operational time is lost when the container is being filled. In order to avoid this, up to now it has been necessary to provide at least two cargo apparatuses of this kind so that one apparatus with a filled container can be attached to an aircraft and be moved whilst the container of the other system is being filled. This would not only require two complete systems. When releasing one system from an aircraft and when attaching the other in each instance the means that are used to rotate or initiate the rotation used for one system have to be uncoupled from the aircraft and these same means have to be connected to the other aircraft. This, too, is time consuming and these connections have to be made correctly since errors can lead to difficulties when emptying the container or can even lead to an unintentional emptying of the container, depending on the type of equipment involved, and this could under certain circumstances have very grave consequences.

It is here that the present invention is intended to provide help. The invention, as is described in patent claim 1, solves the task of creating a transport apparatus for attaching a cargo container to an aircraft, the charging of such container requiring only a negligible portion of the operational time of the aircraft.

The advantages gained by the present invention are essential in that the aircraft, in particular a helicopter, only has to hover for a small fraction of its operational time during which the cargo container brought back empty from one trip is replaced by a cargo container filled with the required material. This makes it possible to transport not only water from an open body of water but other liquid or free-flowing materials such as sand, gravel, concrete, snow, earth, manure, fertilizer and small items in a cost effective way, in particular to locations that are difficult to reach. Particular embodiments of the invention are described in the sub-claims, which also describe further advantages.

Figure 4:
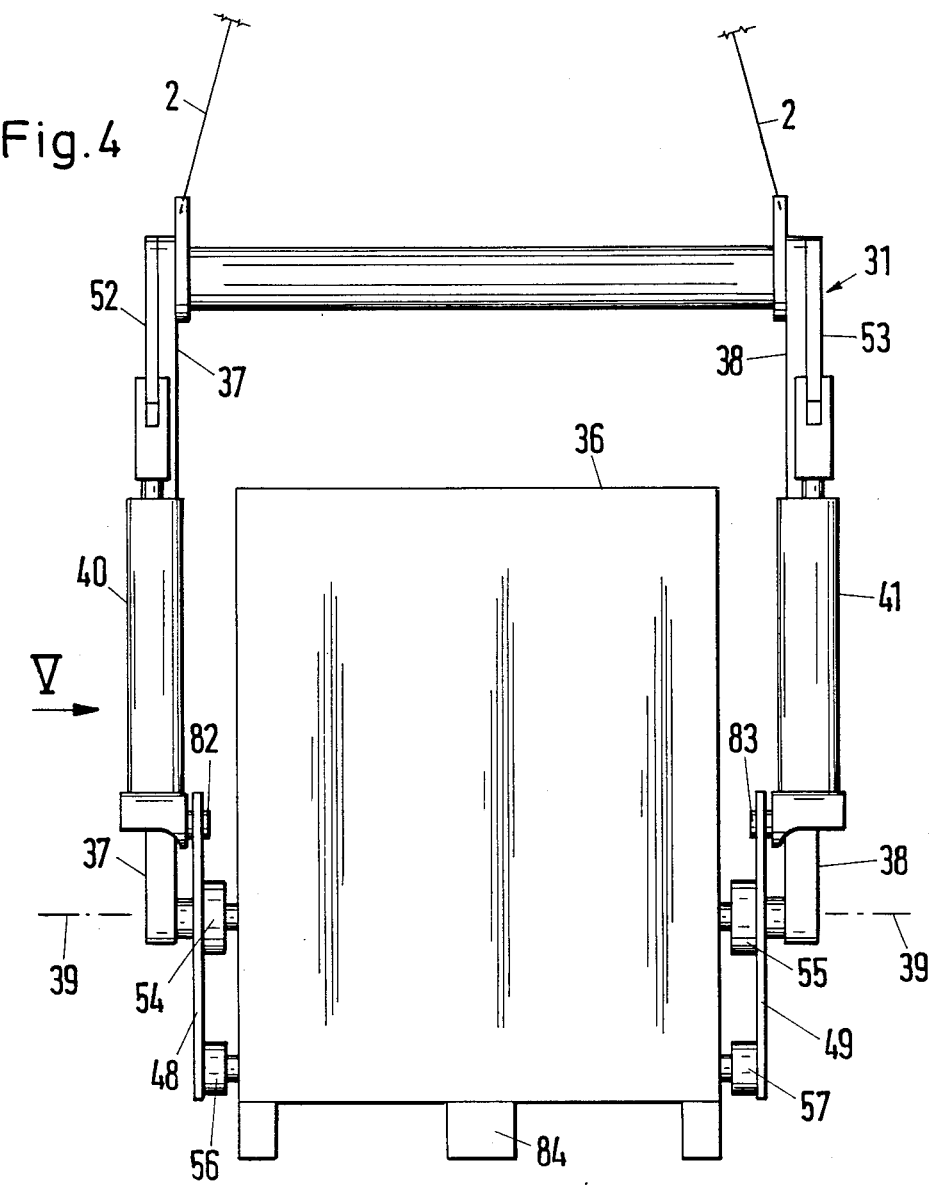
Figure 11:
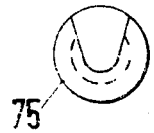
Figure 9:
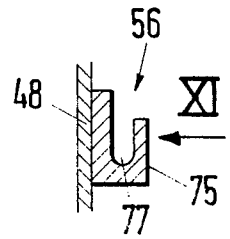
Figure 10:
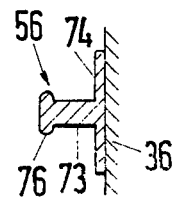
Figure 5:
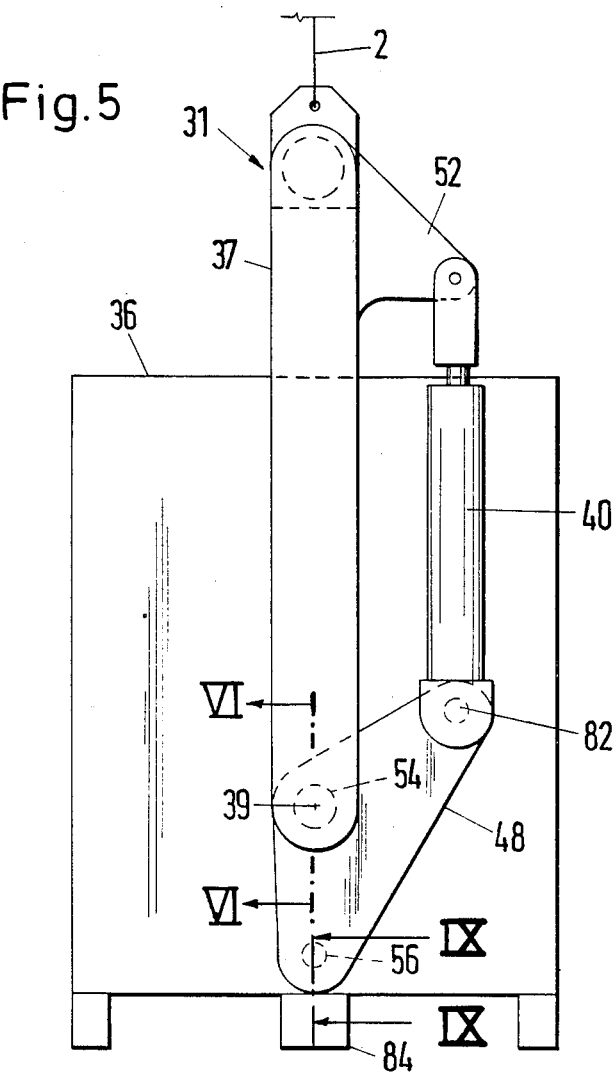
Figure 8:
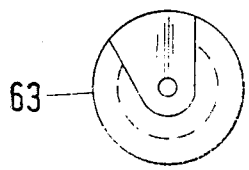
Figure 6:
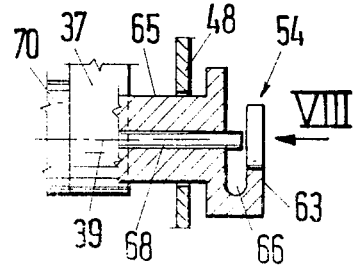
Figure 7:
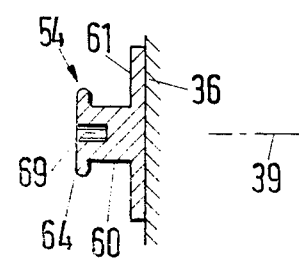

The invention is described in greater detail below on the basis of two embodiments that are shown in the drawing appended hereto. This drawings are as follows:

FIG. 1: A front view of first embodiment of the apparatus;

FIG. 2: A side view in the direction II in FIGS. 1 and 3;

FIG. 3: A plan view corresponding to FIG. 1 and FIG. 2;

FIG. 4: A front view of a second embodiment of the transport apparatus;

FIG. 5: Side view in the direction V in FIG. 4;

FIGS. 6 and 7: A cross-section of the line VI—VI in FIG. 5, in a large-scale exploded view;

FIG. 8: A view in the direction VIII in FIG. 6;

FIGS. 9 and 10: A cross-section of the line IX—IX in FIG. 5, in a large-scale exploded view;

FIG. 11: A view in the direction XI in FIG. 9.

In its basic form, the apparatus shown in FIGS. 1–3 consists of a U-shaped supporting frame 1 that is suspended on two supporting cables 2 that are connected through a connector 3 to the load cable 5 of a helicopter (not shown herein), and a cargo container 6 that is installed on the arms 7 of the supporting frame 1 so as to be able to rotate about a horizontal pivot shaft 9, and a drive system with two piston-cylinder units 10 that are used to rotate the container 6.

The connector element 3 serves to maintain the apparatus with its pivot shaft 9 transverse to the direction of straight-line flight of the helicopter, and is known from EP-A-O 004 955. The cargo container 6 is held by a holder 12 that is installed so as to be able to rotate on the arms 7 of the supporting frame 1, on which the drive system acts. The holder 12 has two journals 13, each of which is supported in a pivot bearing 14 at the unattached end of the arm 7. The holder 12 consists essentially of a part 18 that supports the base 16 of the container 6, a part 19 that encloses the container 6 on the peripheral half of one side of the supporting frame 1, in the centre of which and at the ends of which the container 6 is supported at the sides. These parts 18 and 19 are connected to each other through an arm 20. The container 6 is connected by means not shown herein to the container 12 so as to be releasable. For example, it can be supported radially by means of a belt that lies against its other peripheral half and is secured to part 19 and can be secured axially to the holder 12 in order that it can also be held in an inclined position, as indicated at 1a, 1b, and 1c in FIG. 2. The container 6 can also have feet (not shown herein) in order that, if the part 18 is suitably configured, it can be set in the holder 12 with the help of a fork-lift vehicle and removed therefrom by the same means.

The cylinder-piston units 10 are double acting units and are connected through two hoses (not shown herein) and a control valve (not shown herein) installed within the helicopter with a compressor, also installed within the helicopter, that is used for other purposes. These are supported at one end on a projection 22 at the upper end of the arm 7 and at the other end on a plate 23 that is mounted on part 19 of the holder 12, in such a manner that they can pivot.

In the embodiment shown in FIGS. 4–10 the holder consists of two plate-like retainer plates 48 and 49 that are each installed on one of the arms 37 and 38 of the carrier 31 so as to be able to rotate and are connected by connectors 54–57 (shown in greater detail in FIGS. 6–11) to the casing of the container 36 in such a manner as to be releasable. The cylinder-piston units 40, 41, which are also double-acting, are each connected to a projection 52 or 53, respectively, at the upper ends of the arms 37 or 38, respectively, so as to be able to pivot; each of these engages on one of the retainer plates 48 and 49 and are powered from the helicopter in the same manner as the cylinder-piston units 10 (FIGS. 2 and 3) as described heretofore.

The connector element 54 shown in FIGS. 6–8 consists of mushroom-shaped part 60, that is connected rigidly with the casing of the container 36, and to this end is made with a flange 61, and a part 63, that accommodates the head 64 of the mushroom-shaped part 60 and is formed on a pin 65 that is connected rigidly with the arm 37 of the carrier 31; this pin 65 forms a journal for the retainer plate 48. The mushroom head 64 can be inserted from above into a space 66 in the part 63 and supported below and at the sides in this and can be withdrawn upwards from this space 66. As can be seen, when assembled, the parts 60 and 63 are co-axial to the pivot shaft 39. In this state a pin 68 which can be displaced co-axially in part 63 can be slid into a drilling 69 in the part 60 in order to secure the mushroom head 64 within the space 66. A suitably small fluid motor 70 (not shown herein) is arranged on the outer side of the retainer plate 48 to provide for the back and forth movement of the easily moved pin 68; this hydraulic motor is powered with compressed air from the compressor installed within the helicopter for other purposes and can be activated by means of a control valve (not shown herein) that is arranged on the carrier 1 when the apparatus is on the ground. The connector element 55 is constructed in the same way as the connector element 54 and this is installed diametrically opposite by its flange that corresponds to the flange 61 on the container 36 and is secured to the arm 38 by a stud that corresponds to the stud 65 on which the retainer plate 49 is supported so as to be able to rotate, on the arm 38 and has a fluid motor that corresponds to the fluid motor 70.

The connector element 56 that is shown in FIGS. 9–11 is arranged in the rest position of the container 36 at some distance beneath the connector element 54. Like this, this consists of a mushroom-shaped part 73 with a flange 74 that is secured to the container 36 and a part 75 that accommodates the head 76 of the mushroom-shaped part 73 and, unlike the part 63 of the retainer plate 48 is not connected with the arm 37 of the carrier 31 but is fixed rigidly to the retainer plate 48. In the rest position of the retainer plate 48 the part 75 is in the position shown in FIGS. 9 and 11, when the mushroom head 76 can be inserted from above into the space 77 of the part 75, can be supported from below and on the sides within this, and can be removed from it from above. The connector 57 is arranged diametrically opposite the connector 56 on the container 36; its flange, which corresponds to the flange 74 is connected to the container and its part that corresponds to the part 75 is rigidly connected to the retainer plate 49. At one end the piston-cylinder units 40 and 41 are supported so as to be able to pivot on a projection 52 or 53, respectively at the upper end of the arms 37 or 38, respectively, of the carrier 31, and at the other end are connected through a pivot joint 82 or 83, respectively, with the retainer plate 48 or 49, respectively. The geometrical axes of the cylinder-piston units 40 and 41 subtend an obtuse angle with the line between the pivot joint 82 or 83, respectively, that act as a crank and the connector element 54 or 55, respectively; this angle decreases when the container 36 in FIG. 5 is rotated clockwise. This takes into account the fact that the traction that is exerted by the gravitational force of the container 36 on the cylinder-piston units 40 and 41 increases during such rotation. The same applies to the embodiment of the apparatus that is shown in FIGS. 1–3. The piston-cylinder units 40 and 41 make it possible to rotate the container 36 at a desired speed and retain it in a desired tilted position. Like the fluid motors 70 they are connected to the compressor within the helicopter by pressure lines (not shown herein). These lines are best laid above the carrier 31 (or 1, respectively) and along the supporting cable 2 and can pass, together with a supporting cable, within a protective sleeve, for example of a woven textile.

The container 36 has projecting feet 84 on its base, so that the fork of a fork-lift truck can be inserted beneath the container when it is on the ground.

We claim:

1. A transport apparatus for attaching a cargo container (36) to an aircraft, in particular to a helicopter, comprising a U-shaped supporting frame (31) that is adapted to be attached to an aircraft, said supporting frame having a pair of arms (37, 38), a cargo container (36), horizontal pivot shaft means (65) attached to said pair of arms (37, 38), a holder (48, 49) for said cargo container (36), said holder having two retainer plates (48, 49) respectively connected to pivot about said horizontal pivot shaft means (65) on said pair of arms (37, 38) whereby the cargo container (36) held by said holder (48, 49) can be rotated about the horizontal pivot shaft means (65), at least four releasable connector elements (54–57), each of the connector elements consists of a mushroom-shaped part (60, 73) that is attached to the container (36), said mushroom-shaped part having a mushroom head (64, 76), and a part (63, 75) that accommodates the mushroom head (64, 76), in which the mushroom head (64, 76) can be introduced from above, supported below and at the sides, and from which it can be withdrawn upwards when the holder (48, 49) and the cargo container is in the rest position, two of said connector elements (54, 55) are arranged so as to be co-axial to the pivot shaft means (65), and the part (63) of the said two connector elements (54, 55) that accommodate the mushroom head (64) is rigidly connected to said pivot shaft means (65) on the arms (37, 38) of said pair of arms, at least two further of said connector elements (56, 57) are arranged above or beneath the first mentioned two connector elements (54, 55) when the cargo container (36) and the holder (48, 49) for said cargo container (36) is in the rest position, the parts (75) of the said two further of said connector elements (56, 57) that each accommodates a said mushroom head (76) of the connector elements (56, 57) are rigidly connected with one of the retainer plates (48, 49), and a drive system (40, 41) connected on said supporting frame (31) and connected to said holder to rotate said holder and cargo container (36) on said supporting frame (31).

2. An apparatus as defined in claim 1, wherein the mushroom-shaped part (60) of at least the said two connector elements (54, 55) that are co-axial to the pivot shaft means (65) is provided with a central hole (69); and wherein within the part (63) that accommodates this mushroom head (64) a stud (68) that is co-axial to the pivot shaft means (65) is supported so as to be able to slide relative thereto and to engage in the central hole (69) of said first mentioned mushroom-shaped part (60).

3. An apparatus according to claim 1, wherein said drive system (40, 41) includes two fluid-driven double-acting piston-cylinder units (40, 41) each supported on one arm of said pair of arms (37, 38) of the supporting frame (31) and engage the retainer plate (48, 49) that is supported on that arm (37, 38), so as to be able to rotate the said two retainer plates (48, 49) with the container (36).

4. An apparatus according to claim 1, and said container (36) is provided with feed (84) whereby the fork of a fork-lift truck can be introduced beneath the container (36) when it is placed on a supporting surface.

* * * * *